(12) United States Patent
Grabowski et al.

(10) Patent No.: US 7,950,237 B2
(45) Date of Patent: May 31, 2011

(54) MANAGING SPOOL BEARING LOAD USING VARIABLE AREA FLOW NOZZLE

(75) Inventors: Zbigniew M. Grabowski, Farmington, CT (US); Michael Winter, New Haven, CT (US)

(73) Assignee: United Technologies Corporation, Hartford, CT (US)

( * ) Notice: Subject to any disclaimer, the term of this patent is extended or adjusted under 35 U.S.C. 154(b) by 976 days.

(21) Appl. No.: 11/767,844

(22) Filed: Jun. 25, 2007

(65) Prior Publication Data

US 2008/0317588 A1    Dec. 25, 2008

(51) Int. Cl.
*F02K 1/00* (2006.01)
(52) U.S. Cl. .............. 60/771; 60/226.1; 60/242; 60/779
(58) Field of Classification Search .................. 60/226.1, 60/770, 771, 779, 226.3, 242, 39.019, 39.282, 60/263.3; 415/74.1, 104; 239/265.11, 265.33, 239/265.37, 265.39
See application file for complete search history.

(56) References Cited

U.S. PATENT DOCUMENTS

| 6,378,293 | B1 * | 4/2002 | Care et al. ..................... 60/226.1 |
| 2002/0079404 | A1 | 6/2002 | Schroeder et al. |
| 2005/0286823 | A1 * | 12/2005 | Singh et al. ................... 384/448 |

FOREIGN PATENT DOCUMENTS

| EP | 1 304 463 A1 | 4/2003 |
| EP | 1 312 768 A1 | 5/2003 |
| EP | 1 609 955 A1 | 12/2005 |
| JP | 52 137522 A | 11/1977 |
| JP | 5059901 A | 3/1993 |
| JP | 6264769 A | 9/1994 |

OTHER PUBLICATIONS

European Search Report for EP Application No. 08252056.0, Nov. 15, 2010.

* cited by examiner

*Primary Examiner* — Michael Cuff
*Assistant Examiner* — Phutthiwat Wongwian
(74) *Attorney, Agent, or Firm* — Carlson, Gaskey & Olds PC

(57) ABSTRACT

A turbine engine provides a spool supporting a turbine. The spool is arranged in a core nacelle and includes a thrust bearing. A fan is arranged upstream from the core nacelle and is coupled to the spool. A fan nacelle surrounds the fan and core nacelle and provides a bypass flow path that includes a fan nozzle exit area. A flow control device is adapted to effectively change the fan nozzle exit area. A controller is programmed to monitor the thrust bearing and command the flow control device in response to an undesired load on the thrust bearing. Effectively changing the fan nozzle exit area with the flow control device actively manages the bearing thrust load to desired levels.

9 Claims, 1 Drawing Sheet

MANAGING SPOOL BEARING LOAD USING VARIABLE AREA FLOW NOZZLE

BACKGROUND OF THE INVENTION

This application relates to turbine engine bearings. More particularly, the application relates to bearing load management in a turbofan turbine engine, for example.

One typical turbofan engine includes high and low spools. A fan is coupled to the low spool, which also supports a low pressure compressor and low pressure turbine, for example. In one example, a high pressure compressor and high pressure turbine are coupled to the high spool. The low and high spools are supported within a housing provided by an engine core using bearings. In one example, engine core is covered by a core nacelle.

Some turbofan engines include a bearing load sensor in communication with a thrust bearing. The axial loads at the thrust bearing are recorded for maintenance purposes, for example. The bearing loading is not actively managed in response to any measured bearing load.

Some turbofan engines include a gear train arranged between one portion of the low spool, which supports the low pressure turbine, and another portion of the low spool that supports the fan. These types of geared turbofan engines can result in large bearing thrust loads that are substantially higher than non-geared turbofan engines. What is needed is an apparatus and method of actively managing bearing loads in a turbine engine.

SUMMARY OF THE INVENTION

A turbine engine provides a spool supporting a turbine. The spool is arranged in an engine core and supported on bearings, which includes a thrust bearing. The engine core is covered by a core nacelle. A fan is arranged upstream from the core nacelle and is coupled to the spool. A fan nacelle surrounds the fan and core nacelle and provides a bypass flow path that includes a fan nozzle exit area. A flow control device is adapted to effectively change the fan nozzle exit area. A controller is programmed to monitor the thrust bearing and command the flow control device in response to an undesired load on the thrust bearing. Effectively changing the fan nozzle exit area with the flow control device actively manages the bearing thrust load to desired levels.

These and other features of the application can be best understood from the following specification and drawings, the following of which is a brief description.

DETAILED DESCRIPTION OF THE PREFERRED EMBODIMENT

Figure 1:
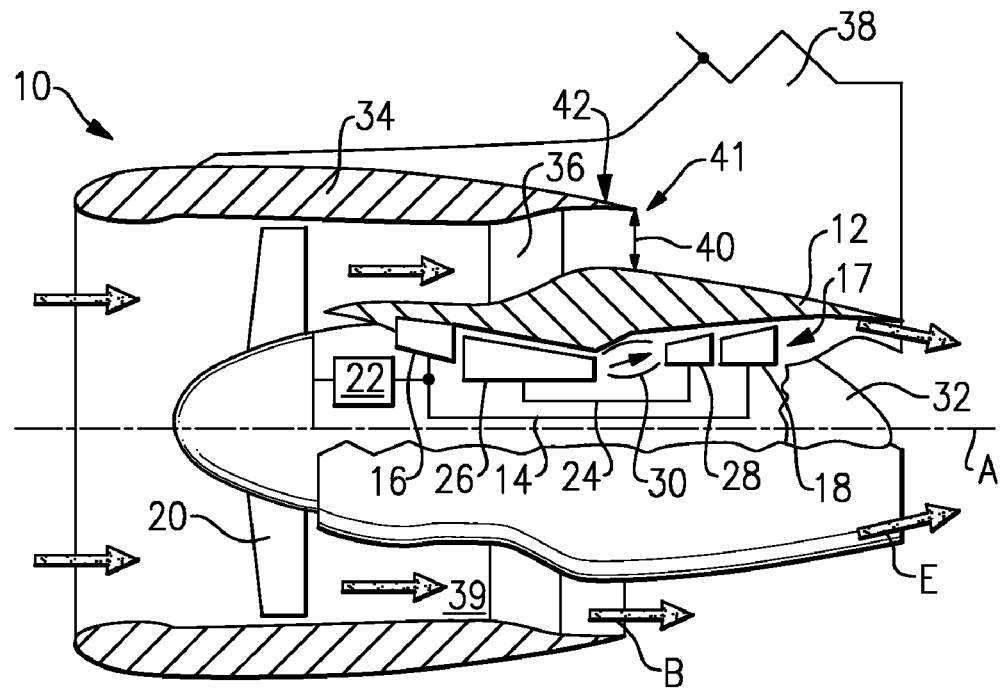
FIG. 1 is a cross-sectional view of an example geared turbofan engine.

A geared turbofan engine 10 is shown in FIG. 1. A pylon 38 supports the engine 10 on an aircraft. The engine 10 includes a core nacelle 12 that houses a low spool 14 and high spool 24 rotatable about an axis A. The low spool 14 supports a low pressure compressor 16 and low pressure turbine 18. In the example, the low spool 14 drives a fan 20 through a gear train 22. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and the combustion gases are expanded in turbines 18, 28.

In the examples shown, the engine 10 is a high bypass turbofan arrangement. In one example, the bypass ratio is greater than 10:1, and the fan diameter is substantially larger than the diameter of the low pressure compressor 16. The low pressure turbine 18 has a pressure ratio that is greater than 5:1, in one example. The gear train 22 is an epicycle gear train, for example, a star gear train, providing a gear reduction ratio greater than 2.5:1. It should be understood, however, that the above parameters are only exemplary of a contemplated geared turbofan engine. That is, the invention is applicable to other engines including direct drive fans.

Airflow enters a fan nacelle 34, which surrounds the core nacelle 12 and fan 20. The fan 20 directs air into the engine core 17, which is covered by the core nacelle 12. The air is used to drive the turbines 18, 28, as is known in the art. Turbine exhaust E exits the engine core 17 and core nacelle 12 once it has been expanded in the turbines 18, 28, in a passage provided between the core nacelle and a tail cone 32.

The core nacelle 12 is supported within the fan nacelle 34 by structure 36, which are commonly referred to as upper and lower bifurcations. A generally annular bypass flow path 39 is arranged between the core and fan nacelles 12, 34. The example illustrated in FIG. 1 depicts a high bypass flow arrangement in which approximately eighty percent of the airflow entering the fan nacelle 34 bypasses the core nacelle 12. The bypass flow B within the bypass flow path 39 exits the fan nacelle 34 through a fan nozzle exit area 40.

For the engine 10 shown in FIG. 1, a significant amount of thrust may be provided by the bypass flow B due to the high bypass ratio. Thrust is a function of density, velocity and area. One or more of these parameters can be manipulated to vary the amount and direction of thrust provided by the bypass flow B. In one example, the engine 10 includes a structure associated with the fan nozzle exit area 40 to change the physical area and geometry to manipulate the thrust provided by the bypass flow B. However, it should be understood that the nozzle exit area may be effectively altered by other than structural changes, for example, by altering the boundary layer, which changes the flow velocity. Furthermore, it should be understood that any device used to effectively change the nozzle exit area is not limited to physical locations near the exit of the fan nacelle 34, but rather, includes altering the bypass flow B at any suitable location.

The engine 10 has a flow control device 41 that is used to effectively change the nozzle exit area. In one example, the flow control device 41 provides the fan nozzle exit area 40 for discharging axially the bypass flow B pressurized by the upstream fan 20 of the engine 10. A significant amount of thrust is provided by the bypass flow B due to the high bypass ratio. The fan 20 of the engine 10 is designed for a particular flight condition, for example, typically cruise at 0.8M and 35,000 feet (10,668 m). In one example, the flow control device 41 provides an approximately 20% change in the fan nozzle exit area 40.

In one example, the fan nacelle 34 includes members such as multiple hinged flaps 42 (one shown) arranged circumferentially about the rear of the fan nacelle 34. The flap 42 is shown schematically in FIG. 2 rotatable about a pivot P. The flaps 42 can be actuated independently and/or in groups angularly using actuators 46, for example. Alternatively, the members on the fan nacelle are provided by multiple moveable cowlings, arranged circumferentially about the rear of the fan nacelle 34. The cowlings are moveable generally axially to vary the fan nozzle exit area 40.

Figure 2:
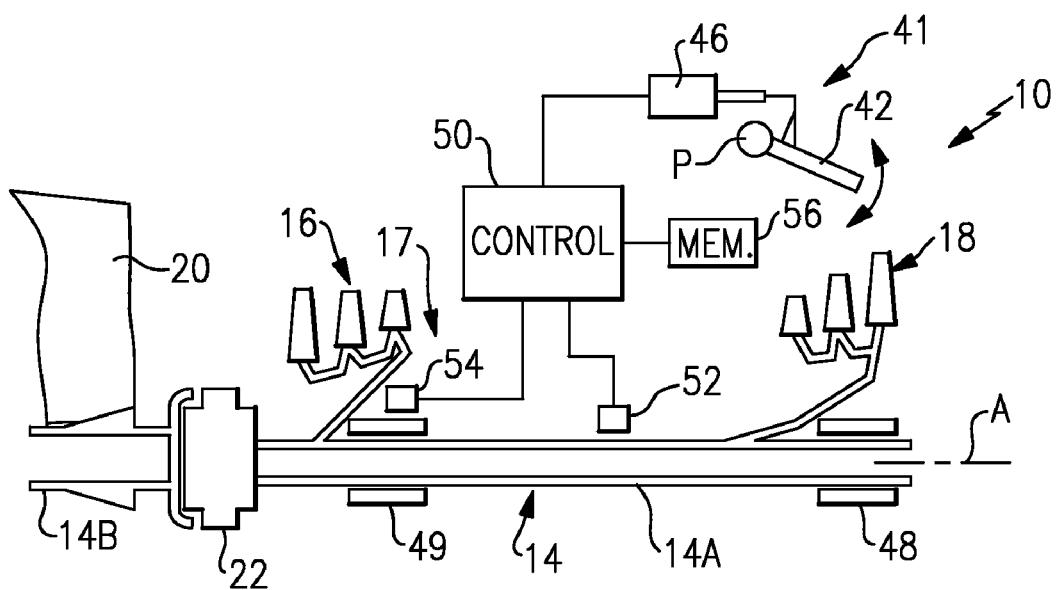
FIG. 2 is a schematic view of an example flow control device used to manage bearing loads.

Referring to FIG. 2, a controller 50 is in communication with the actuator 46, which manipulates the flaps 42 between open and closed positions in the example shown. Modulating the flap position changes the flow characteristics through the core and/or fan nacelles 12, 34. In this manner, the flow control device 41 can actively manage the axial thrust loading of the low pressure spool 14.

In one example, the low pressure spool 14 includes a first portion 14*a* that supports the low pressure compressor 16 and low pressure turbine 18. The gear train 22 interconnects the first portion 14*a* to a second portion 14*b*, which supports the fan 20. The first portion 14*a* is shown schematically supported by a journal bearing 48 and a thrust bearing 49. A thrust load sensor 54 is associated with the thrust bearing 49 to measure the thrust loads exerted on the thrust bearing 49 along axis A by the first low pressure spool portion 14*a* during operation of the engine 10.

The thrust load sensor 54 is in communication with the controller 50. The controller 50 monitors the thrust bearing load and records the values in a memory 56. In operation, the controller 50 commands the actuator 46 to manipulate the flaps 42 to effectively change the fan nozzle exit area 40, ensuring that the axial load on the thrust bearing 49 does not reach an undesired level of thrust load. In one example, a speed sensor 52 is also in communication with the controller 50 to provide rotational speed information relating to the low spool 14. In one example, the fan nozzle exit area 40 is increased to reduce the thrust load on the thrust bearing 49 to reduce wear and extend its life. However, it should be understood that the fan nozzle exit area 40 may be decreased under some operating conditions to decrease the thrust load.

Although a preferred embodiment has been disclosed, a worker of ordinary skill in this art would recognize that certain modifications would come within the scope of the claims. For that reason, the following claims should be studied to determine their true scope and content.

What is claimed is:

1. A turbine engine comprising:
   a bearing, and a sensor in communication with the bearing and configured to detect a load condition;
   a fan nacelle including a nozzle exit area;
   a flow control device adapted to effectively change the nozzle exit area; and
   a controller in communication with the sensor and configured to command the flow control device in response to an undesired load on the bearing to adjust the fan nozzle exit area.

2. The turbine engine according to claim 1, wherein the bearing supports a spool having a turbine, and the nacelle is a core nacelle surrounding the turbine, and a fan is arranged upstream from the core nacelle and coupled to the spool, the fan nacelle surrounding the fan and core nacelle and providing a bypass flow path that includes the nozzle exit area.

3. A turbine engine comprising:
   a bearing;
   a nacelle including a nozzle exit area;
   a flow control device adapted to effectively change the nozzle exit area;
   a controller programmed to monitor the bearing and command the flow control device in response to an undesired load on the bearing; and
   wherein the bearing supports a spool having a turbine, and the nacelle is a core nacelle surrounding the turbine, and a fan is arranged upstream from the core nacelle and coupled to the spool, the fan nacelle surrounding the fan and core nacelle and providing a bypass flow path that includes the nozzle exit area, wherein the spool is a low pressure spool, and the turbine is a low pressure turbine.

4. The turbine engine according to claim 3, wherein the low pressure spool includes first and second portions, the first portion supporting the low pressure turbine and the second portion supporting the fan, and a gear train interconnecting the first and second portions of the low pressure spool.

5. The turbine engine according to claim 3, wherein the low pressure spool supports a low pressure compressor, and a high pressure spool coaxial with the low pressure spool and supporting a high pressure turbine.

6. The turbine engine according to claim 1, wherein the flow control device includes a member moveable between open and closed positions to physically change the nozzle exit area.

7. The turbine engine according to claim 1, wherein the flow control device includes an actuator for manipulating a member to effectively change the nozzle exit area.

8. The turbine engine according to claim 2, wherein the bearing is a thrust bearing and the undesired load is an undesired thrust load along an axis provided by the spool.

9. The turbine engine according to claim 1, wherein the controller is programmed to acquire load data, and a memory adapted to store the load data.

* * * * *